(12) United States Patent
Perry et al.

(10) Patent No.: US 12,367,284 B2
(45) Date of Patent: Jul. 22, 2025

(54) SYSTEMS AND METHODS FOR DETERMINING MEASUREMENTS OF SIMILARITY BETWEEN VARIOUS TYPES OF DATA

(71) Applicant: Cybereason Inc., Boston, MA (US)

(72) Inventors: Yonatan Perry, Neve Yarak (IL); Assaf Ben-David, Tel Aviv (IL); Uri Sternfeld, Tel Aviv (IL)

(73) Assignee: Cybereason Inc., Boston, MA (US)

( * ) Notice: Subject to any disclaimer, the term of this patent is extended or adjusted under 35 U.S.C. 154(b) by 0 days.

(21) Appl. No.: 17/443,077

(22) Filed: Jul. 20, 2021

(65) Prior Publication Data
US 2022/0019665 A1 Jan. 20, 2022

Related U.S. Application Data

(60) Provisional application No. 63/054,138, filed on Jul. 20, 2020.

(51) Int. Cl.
*G06F 21/56* (2013.01)
*G06F 18/22* (2023.01)
(Continued)

(52) U.S. Cl.
CPC ............ *G06F 21/564* (2013.01); *G06F 18/22* (2023.01); *G06F 18/24147* (2023.01); *G06F 21/10* (2013.01); *G06F 21/53* (2013.01)

(58) Field of Classification Search
CPC ........ G06F 21/564; G06F 21/53; G06F 21/10; G06F 21/563; G06F 21/577;
(Continued)

(56) References Cited

U.S. PATENT DOCUMENTS

| 7,792,846 B1 * | 9/2010 | Raffill | G06F 16/35 |
| | | | 707/754 |
| 8,566,321 B2 * | 10/2013 | Majumdar | G06F 16/355 |
| | | | 707/804 |

(Continued)

FOREIGN PATENT DOCUMENTS

| WO | 2017/004589 | 1/2017 | |
| WO | WO-2017004589 A1 * | 1/2017 | ............. G16B 30/00 |

OTHER PUBLICATIONS

Soto et al., Title: "Hardware acceleration of k-mer clustering using locality-sensitive hashing", Year published: 2019, Universidad de Concepcion, Chile, pp. 659-662 (Year: 2019).*

*Primary Examiner* — Farid Homayounmehr
*Assistant Examiner* — Suman Debnath
(74) *Attorney, Agent, or Firm* — DLA PIPER LLP (US)

(57) ABSTRACT

Systems and methods are provided to measure the similarity between a first and second data sample. The method can include creating a plurality of k-mers from the first data sample, each k-mer having a first length; generating a first vector from the plurality of k-mers by processing the plurality of k-mers with a plurality of hash functions; calculating a similarity level between the first and second data sample by comparing the first vector to a second vector, the second vector representing the second data sample; and based on the similarity level, determining a maliciousness level of the first data sample.

31 Claims, 7 Drawing Sheets

(51) Int. Cl.
*G06F 18/2413* (2023.01)
*G06F 21/10* (2013.01)
*G06F 21/53* (2013.01)

(58) Field of Classification Search
CPC .......... G06F 2221/0737; G06K 9/6215; G06K 9/6276; G06V 10/762
See application file for complete search history.

(56) References Cited

U.S. PATENT DOCUMENTS

| | | | | |
|---|---|---|---|---|
| 10,491,240 | B1* | 11/2019 | Dupont | H03M 7/3088 |
| 10,783,247 | B1* | 9/2020 | Steinfadt | G06F 21/564 |
| 10,880,270 | B1* | 12/2020 | Rigor | H04L 63/1458 |
| 11,075,987 | B1* | 7/2021 | Solapurkar | H04L 67/1023 |
| 2014/0344345 | A1* | 11/2014 | Venkatraman | G06F 16/957 |
| | | | | 709/203 |
| 2017/0286544 | A1* | 10/2017 | Hunt | H04L 63/123 |
| 2018/0096149 | A1* | 4/2018 | Morkovský | G06F 21/566 |
| 2019/0114362 | A1* | 4/2019 | Subbian | G06F 16/9535 |
| 2019/0172553 | A1* | 6/2019 | Wu | G16B 20/00 |
| 2019/0199736 | A1* | 6/2019 | Howard | G06N 20/00 |
| 2020/0050941 | A1* | 2/2020 | Zhuang | G06N 3/084 |
| 2020/0074080 | A1* | 3/2020 | Srinivasagopalan | G06F 16/2462 |
| 2020/0074275 | A1* | 3/2020 | Xia | G06N 3/0445 |
| 2020/0314122 | A1* | 10/2020 | Jones | G06F 16/9566 |
| 2021/0141833 | A1* | 5/2021 | Davis | G16B 10/00 |
| 2021/0249102 | A1* | 8/2021 | Hurwitz | G16B 50/30 |
| 2021/0279330 | A1* | 9/2021 | Mitra | G06F 11/1446 |

\* cited by examiner

SYSTEMS AND METHODS FOR DETERMINING MEASUREMENTS OF SIMILARITY BETWEEN VARIOUS TYPES OF DATA

REFERENCE TO RELATED APPLICATIONS

This application claims priority to U.S. Provisional Application No. 63/054,138, filed on Jul. 20, 2020, which is herein incorporated by reference in its entirety.

FIELD OF THE DISCLOSURE

Embodiments of the present disclosure relate to cybersecurity and, more particularly, to systems and methods for determining the similarity between data samples.

BACKGROUND OF THE DISCLOSURE

For many years, the computing world and the cybersecurity industry within it have been heavily relying on tests of exact matching between entities (usually using a cryptographic hash function) for various purposes, such as malware detection and verification of authenticity. While useful, exact matching also has various limitations. Its "all or nothing" approach prevents it from being used for measuring the degree of similarity between entities. Such a measurement can prove extremely useful in many computing tasks and especially for purposes of cybersecurity. However, while some methods for calculating degrees of similarity exist, no such method has proven robust, efficient and practical enough to be widely adopted by the cybersecurity community.

Similarity between entities is useful in many scenarios. Its advantage lies in introducing flexibility into any analysis involving matching entities, thus providing a set of powerful tools such as neighbor querying and clustering. These, in turn, allow for many higher-level practical uses, such as detecting malicious entities by their similarity to a database of malicious content, grouping entities for display or analysis purposes, and assisting in the process of artifact analysis by identifying similar artifacts to those analyzed previously. It is also applicable to many types of entities, such as executable programs, document files, textual scripts, domain user profiles, log entries, network packets, web pages and memory buffers.

In many of these scenarios, and especially for cybersecurity applications, the similarity between entities can play a meaningful role. This is due to the realization that creation of samples (e.g., malware samples) is rarely done from scratch. For example, development of malicious code is often based on previous versions, existing libraries, etc. This is also the case when organizing a malicious campaign which is not reliant on code (e.g., a phishing campaign)—some parts tend to be reused between instances. It simply takes a lot of work to completely "reinvent the wheel" for each new sample. It is therefore expected that samples which are similar may share some characteristics, such as both being created by the same malicious agent or group, having common functionality or objective, having a common 'ancestor', or being roughly contemporaneous. Common parts can be, for example, resources such as icons, fragments of text or even code segments. Moreover, identifying these similar parts can serve as a means of identifying such agents or groups and attribute the malicious sample to them.

SUMMARY OF THE DISCLOSURE

According to one aspect of the present disclosure, a computer-implemented method for classifying a data sample can include creating a plurality of k-mers from the data sample, each k-mer having a first length; generating a vector from the plurality of k-mers by processing the plurality of k-mers with a plurality of hash functions; comparing the vector to at least one other vector to determine at least one distance metric, the at least one other vector representing at least one other sample; and based on the at least one distance metric, determining a characteristic of the data sample.

According to another aspect of the present disclosure, a computer-implemented method for classifying a data sample can include identifying a subsequence of the data sample; creating a plurality of k-mers from the subsequence of the data sample, each k-mer having a first length; generating a vector from the plurality of k-mers by processing the plurality of k-mers with a plurality of hash functions; comparing the vector to at least one other vector to determine at least one distance metric, the at least one other vector representing at least one subsequence of other samples; and based on the at least one distance metric, determining a characteristic of the data sample.

According to another aspect of the present disclosure, a computer-implemented method for scanning a data sample can include identifying a plurality of subsequences of the data sample; and for each subsequence: creating a plurality of k-mers from the respective subsequence, each k-mer having a first length; generating a vector from the plurality of k-mers by processing the plurality of k-mers with a plurality of hash functions; comparing the vector to a set of reference vectors to determine a set of distance metrics; and based on the set of distance metrics, determining a characteristic of the data sample.

According to another aspect of the present disclosure, a system for protecting a plurality of endpoints can include a server communicably coupled to a plurality of endpoints. The server can be configured to identify a data sample on an endpoint of the plurality of endpoints; create a plurality of k-mers from the data sample, each k-mer having a first length; generate a vector from the plurality of k-mers by processing the plurality of k-mers with a plurality of hash functions, wherein the plurality of hash functions is chosen at random for each endpoint; determine a distance metric between the data sample and a reference data sample by comparing the vector to a reference vector, the reference vector representing the reference data sample; and based on the distance metric, determine a maliciousness level of the data sample.

According to another aspect of the present disclosure, a computer-implemented method for preventing data leaks from a protected environment can include detecting, at an egress gateway, a data sample being transmitted outside of the protected environment; creating a plurality of k-mers from the data sample, each k-mer having a first length; generating a vector from the plurality of k-mers by processing the plurality of k-mers with a plurality of hash functions; comparing the vector to a set of protected vectors to determine at least one distance metric, the protected vectors representing a plurality of protected data samples; and based on the at least one distance metric, preventing the data sample from leaving the protected environment.

According to another aspect of the present disclosure, a computer-implemented method for vectorizing a data sample can include executing the data sample; collecting runtime data associated with the execution of the data sample; creating a plurality of k-mers from the runtime data, each k-mer having a first length; mapping the plurality of k-mers to a plurality of integers with a plurality of hash functions; and generating a vector from the mapped plurality of k-mers with a MinHash function.

According to another aspect of the present disclosure, a computer-implemented method for vectorizing a data sample can include creating a plurality of k-mers from the data sample, each k-mer having a first length; mapping the plurality of k-mers to a plurality of integers with a plurality of hash functions; and generating a vector from the mapped plurality of k-mers with a MinHash function.

DESCRIPTION

The following detailed description is merely exemplary in nature and is not intended to limit the invention or the applications of its use.

Any measurement of similarity should offer various useful advantages. First, it can be gradual (i.e., sensitive enough to represent varying levels of similarity instead of just the extreme edges representing "near duplicate" and "completely unrelated"). Without this, any measurement of similarity is effectively reduced to a measurement of equality. Secondly, it can be business applicable, meaning that in the context of some application, it is well correlated to the business objective of the application (referred to herein as business similarity). Finally, it should be efficient to compute, so that it can be used practically in many different scenarios.

In addition, within the context of cybersecurity applications, a measurement of similarity should be adversarially resilient, meaning that it is designed to make it hard for an adversary to subvert it. This can be crucial for sustainable usefulness in the cybersecurity landscape.

Embodiments of the present disclosure thus relate to systems and methods for determining measurements of similarity between various types of data. Technical advantages can include that the disclosed system and methods are gradual and able to smoothly represent the full spectrum of similarity. In addition, the disclosed principles can provide calibration tools that can be used to better align with various business similarity objectives. Finally, the disclosed principles are efficient, useful for practically any scenario, and difficult for an adversary to subvert.

The disclosed methods can utilize the computation of locality-preserving hash function digests (referred to herein as "fuzzygrams") and can use the fuzzygrams to estimate actual similarity between data types with high accuracy. This approach, sometimes referred to as "fuzzy hashing," can be a very efficient method of computing data similarity. However, existing systems that have attempted to use such a technique are unable to provide all the technical advantages gradual similarity, business applicability, and adversarial resilience. One example of this is ssdeep (https://ssdeep-project.github.io/ssdeep/).

In addition, embodiments of the present disclosure relate to systems and methods for computing locality-preserving hash function digests based on the Jaccard similarity between sets of overlapping k-mers and using MinHash.

Figure 1:
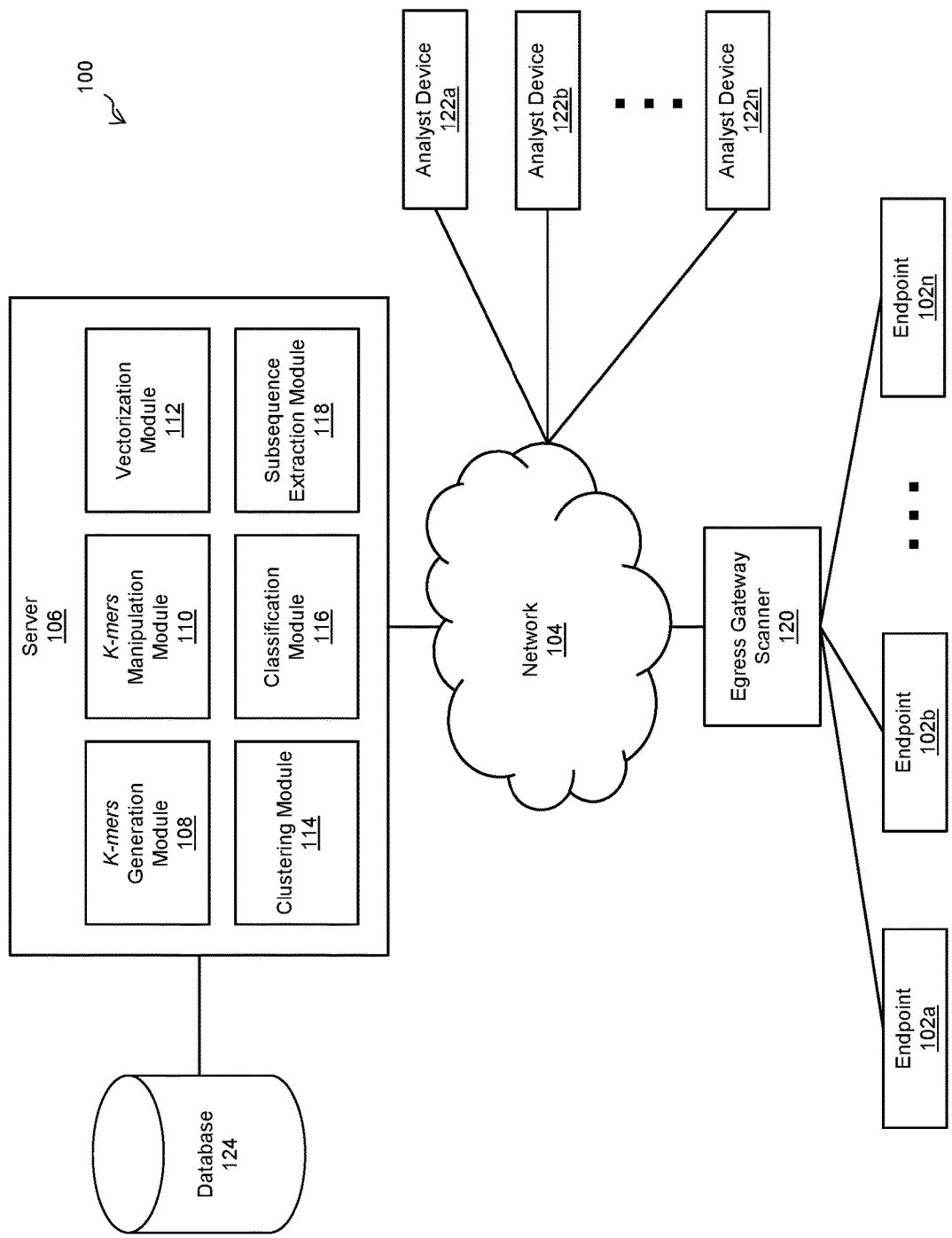
FIG. 1 is a block diagram of an example system for determining measurements of similarity between various types of data, according to some embodiments of the present disclosure.

FIG. 1 is a block diagram of an example system for determining measurements of similarity between various types of data, according to some embodiments of the present disclosure. The system 100 can include a plurality of endpoints 102a-n (generally referred to herein as an "endpoint 102" or collectively referred to herein as "endpoints 102"), a plurality of analyst devices 122a-n (generally referred to herein as an "analyst device 122" or collectively referred to herein as "analyst devices 122"), and a server 106, which are communicably coupled via a network 104. In addition, system 100 includes an egress gateway scanner 120 positioned at an egress gateway associated with the network 104 and the various endpoints 102. In some embodiments, server 106 is configured to monitor the endpoints 102 to detect similarity in data samples and identify malware threats, as well as various similar applications. In addition, server 106 can receive data samples captured by the egress gateway scanner 120, measure their similarity to a pre-defined set of data samples, and prevent the captured data sample from leaving via the network 104.

Endpoints 102 and/or an analyst device 122 can include one or more computing devices capable of receiving user input, transmitting and/or receiving data via the network 104, and or communicating with the server 106. In some embodiments, endpoint 102 and/or an analyst device 122 can be representative of a computer system, such as a desktop or laptop computer. Alternatively, endpoint 102 and/or an analyst device 122 can be a device having computer functionality, such as a personal digital assistant (PDA), a mobile telephone, a smartphone, or other suitable device. In some embodiments, endpoint 102 and/or an analyst device 122 can be the same as or similar to the device 700 described below with respect to FIG. 7.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

Server device 106 may include any combination of one or more of web servers, mainframe computers, general-purpose computers, personal computers, or other types of computing devices. Server device 106 may represent distributed servers that are remotely located and communicate over a communications network, or over a dedicated network such as a local area network (LAN). Server device 106 may also include one or more back-end servers for carrying out one or more aspects of the present disclosure. In some embodiments, server device 106 may be the same as or similar to server device 600 described below in the context of FIG. 6. In some embodiments, server 106 can include a primary server and multiple nested secondary servers for additional deployments of server 106.

As shown in FIG. 1, server 106 includes various modules 108-118, such as k-mers generation module 108, k-mers manipulation module 110, vectorization module 112, clustering module 114, classification module 116, and subsequence extraction module 118. K-mers generation module 108 is configured to divide a data sample into a plurality of k-mers (also known as "k-shingles"). A k-mer can be defined as a small sequence of data within a data sample of size k, which can be a set of consecutive alphanumeric characters.

K-mers manipulation module 110 is configured to perform various manipulations to a set of k-mers for a data sample. Such manipulations can reduce false positives and increase the correlation of similarity detection to desired human/business considerations. Vectorization module 112 is configured to transform the set of k-mers for a data sample into a vector, such as via a MinHash algorithm.

Clustering module 114 is configured to generate clusters of vectors within a vector space, such as vectors for individual data samples as generated by vectorization module 112. In some embodiments, clustering module 114 can apply a mean-shift clustering algorithm to cluster the data sample vectors, which place a weighing function/kernel at each point in the vector space, where each weighing function/kernel has an associated bandwidth parameter. Adding up every kernel then generates a probability surface. The mean-shift clustering algorithm may iteratively shift each kernel to a higher density region in the vector space until it achieves convergence. When convergence is reached, which depends on the bandwidth (the bandwidth reflects the "width" or "scope" of the cluster), all points or vectors that reside within the cluster are then associated with that cluster. Any number of clusters may be generated in the vector space. Because the clustering module 114 is generating clusters of vectors that have been mapped from data samples (some being known and labeled as malware or individual families of malware), it can recognize that similar vectors (and thus similar data samples) should be in the same cluster. In some embodiments, clustering module 114 may use hierarchical clustering analysis to generate a hierarchy of clusters. In some embodiments, clustering module 114 can utilize a variety of clustering techniques, such as k-means, affinity propagation, spectral clustering, hierarchical clustering, density-based spatial cluster of applications with noise (DBSCAN), OPTICS, Gaussian mixture modeling, or Birch.

Classification module 116 is configured to classify data sample vectors. Such classification can include various techniques, such as a Nearest Neighbor Search or by assigning a data sample vector to a cluster within a vector space that includes a plurality of pre-identified clusters, such as those determined by clustering module 114.

Subsequence extraction module 118 is configured to identify and extract subsequences of data from a data sample. This process can allow for vectorization and classification of subsequences of a data sample, rather than the whole sample. In addition, this can allow for the classification of an entire data sample based on analysis of its subsequences, rather than the data sample as a whole.

The various system components—such as modules 108-118—may be implemented using hardware and/or software configured to perform and execute the processes, steps, or other functionality described in conjunction therewith. Additionally, it is important to note that system 100 is not limiting but merely exemplary in nature. For example, in the version of system 100 depicted in FIG. 1, the process of detection, analysis, and identification of malicious contents in data samples takes place in a server-side fashion (i.e., the processing is performed by server 106). In such a depiction, the server 106 may reside at the premises of an organization associated with the endpoints 102 (e.g., a client premises), in a private cloud, in a vendor data warehouse, or in a public cloud. However, in other variations of system 100, one or more of the modules 108-118 can reside on the individual endpoints 102, where malicious content resides, or on specific IT system, where malicious content is processed in transit or stored.

In some embodiments, malicious content can be detected in various locations such as files residing on a disk or other storage devices; files in transit; memory buffers (directly in memory or in a memory dump); textual scripts (e.g., files, parts of shell command lines, or in memory); network data or other communication transmissions; e-mail content, attachments, and other metadata; and IT systems, such as their storage devices and communications and secondary data such as logs and analytics. In addition, the format of detected malicious content can be, for example, executable programs (compiled or otherwise); program scripts written in an interpreted language; data such as that found in text, image, audio, and video files' configuration information, property sheets, and other supporting data; and OS-level virtualization data, such as container image layers. It is important to note that neither of these lists are exhaustive.

Figure 2:
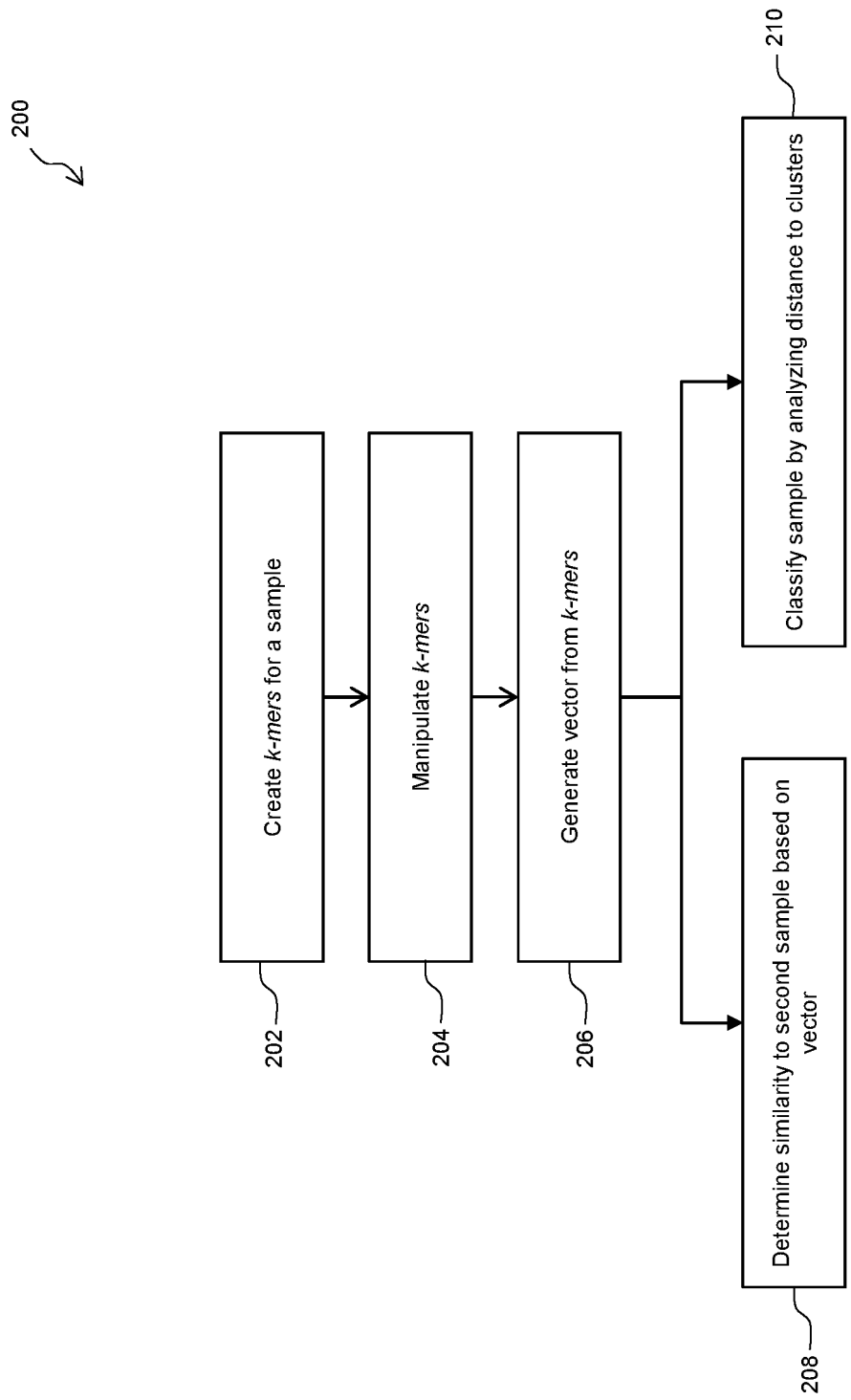
FIG. 2 is an example process for determining measurements of similarity between various types of data that can be performed within the system of FIG. 1, according to some embodiments of the present disclosure.

FIG. 2 is an example process 200 for determining measurements of similarity between various types of data that can be performed within the system of FIG. 1, according to some embodiments of the present disclosure. Process 200 utilizes the concept of generating a "fuzzy" digest for a data sample, such as a file, which represents sections from all over the data sample. However, the order in which data appears in the sample may not be considered, making the analysis resilient to reordering of the data.

In some embodiments, a sample can generally refer to any sequence of bytes. However, the disclosed principles apply to a variety of samples, such as samples whose content is a sequence of values of any magnitude. The values can serve as the analogs for bytes and would be divided into k-mers. In addition, samples whose content is not defined as a sequence of values can also be processed by providing an encoding function that converts samples into such sequences of values. Finally, some samples may include content that is made up of a set of sub-items. These samples can be processed by extracting the k-mer sets for those sub-items and then unifying the sets. Such flexibility allows the disclosed embodiments to process a wide range of entities and samples, binary or otherwise. For each sample, the discrete basic blocks can be defined in some order. Then, taking sequences (e.g., k-mers) of such blocks enables the definition of sets for comparisons. In some embodiments, the basic blocks are diverse enough that such that the k value should be lower than the value for binary samples, even as low as k=1. Furthermore, if the basic blocks do not exhibit any inherent ordering, an arbitrary order can be proposed.

Types of samples can include API calls, web pages, user profiles, groups of user profiles, graphs of related elements, or threat-intelligence reports. API calls can be handled by encoding each function into a unique value and taking the function and its parameter values as basic blocks. Web pages can be handled by utilizing HTML, tags, attributes, and contained values as basic blocks. User profiles can be handled by obtaining their configuration (e.g., from Active Directory) and using the ordered field names and values as basic blocks. Groups of user profiles can be handled by utilizing ordered group configuration field names and values and then unifying the k-mer sets within those of the blocks of the individual users contained in the group. Graphs of related elements, such as those used by Endpoint Detection and Response (EDR) systems, can be handled by encoding each element into a sequence of basic blocks, deriving its k-mer sets, and unifying those sets. Such EDR encoding may be achieved by evaluating the ordered field names and values describing each graph element as basic blocks. Threat-intelligence reports (e.g., VirusTotal file reports) can be handled by using their ordered field names and values as basic blocks.

At block 202, k-mers generation module 108 creates a plurality of k-mers for a data sample, such as a file. This can include setting the parameter k to take on a specific value and dividing the data sample into k-mers, or sequences of consecutive alphanumeric characters k bytes long. The k-mers can overlap, so that each byte (apart from the last k-1) starts a k-mer. The k-mer set of the data sample can then be the set of all k-mers found in the sample. The size of the set can be on the order of size of the data sample if the sample is very diverse, but can also be very small, or even one, if the sample is made up of a constant value.

In some embodiments, the value of k can greatly affect the resulting level of similarity between samples of a given data set. In effect, the k value determines the "alphabet" with which the data is described and analyzed. By considering the set of all k-mers, the relevant factor is whether a certain k-mer appears in the data or not. If k is too small, most data samples will contain most possible k-mers and would therefore tend to be deemed very similar. If, however, k is too large, the set of k-mers of each data sample would tend to be more unique and therefore samples will be deemed more dissimilar. While any value of k produces a valid similarity measurement, its choice has a major impact on the correlation to business relevance, and so should be made carefully.

The value of k depends on the statistical properties of the samples in the data set, as well as the relevant business objectives. Given a data set, histograms of all single bytes, pairs, triplets, etc. can be calculated, where each k-mer is counted once for each sample. The smallest k for which the histogram appears far from uniform can be chosen. For example, when considering only text files, since the number of possible bytes is lower (only printable characters, usually 6 bits per byte), taking quadruplets (k=4) can be helpful to distinguish meaningfully between files. However, for Windows PE executable files, all 256 possible bytes tend to appear more evenly, and so a lower value of k is appropriate (usually k=3). Therefore, in some embodiments, the k value can be 3 or 4. Such a k value can offer advantages when representing each k-mer as an unsigned 32-bit integer, such as the simplification of implementation and improvement in performance. In addition, the number of possible k-mers depends on the statistical properties of the data set, but is typically very large (e.g., around $2^{8k}$).

At block 204, k-mers manipulation module 110 manipulates the k-mers created at block 202. In some embodiments, manipulation of k-mer sets can increase the correlation of the disclosed similarity measurements with user-desired or business-motivated considerations. For example, within a given data set, there may be some properties shared by all or many samples that should be canceled out, otherwise similarity measurements (e.g., Jaccard similarity) could erroneously indicate that different samples are similar. Examples of k-mer manipulations can include the removal of specific k-mers, mapping groups of k-mers into a representative value, and filtering k-mers, although this list is not exhaustive. The removal of specific k-mers can be analogous to the removal of stop words in the field of textual analysis.

One example of k-mer manipulation via the removal of pre-defined k-mers is for Windows PE executable files, which contain the triplet "PE\x00". Because of this inclusion, many, or even all, PE files have some level of similarity to each other just by virtue of being PE files. Therefore, in the case where various PE files are being considered as samples, this layer of similarity can be removed, making the set of samples more dissimilar and increasing the relevance of similarity measurements.

In another example of k-mer removal, the k-mers to be removed from a set of samples can be calculated based on the set, rather than by utilizing a pre-defined list or set. For example, after the k-mers have been created for a set of samples at block 202, k-mer manipulation module 110 can determine the document frequency of each k-mer (i.e., the number of samples in which it appears). The head of the distribution (i.e., the most frequency k-mers) can be considered "stop words" and removed from the set of samples. Several schemes for selecting the cutting point defining the head of the distribution can be implemented, such as selecting a cutoff arbitrarily based on manual examination of the distribution, bimodal distributions, entropy thresholds, etc.

In some embodiments, there may be some groups of k-mers that may be considered equivalent. This can happen, for example, when there is redundancy in the encoding of samples, as exists in most machine code encoding schemes. In these cases, these redundancies may be disregarded by mapping groups of k-mers into a single representative value.

In some embodiments, a sample may not contain enough information to be reliably compared to other samples. If treated as a standard sample, similarity measurements can introduce errors in any application using the measurements. Therefore, k-mers manipulation module 110 can identify "low information samples" and discard them, although other methods of dealing with such samples are possible. There are several methods of measuring the information content of a data sample, such as calculating its Shannon entropy. Other quantities may also be used, which may be easier to compute. This can useful in cases of small samples, the probability of it being technically similar to other samples without being "business similar" becomes non-negligible. In addition, performing an information theoretic measurement can also be utilized to measure the level of information in a data sample. Information theoretic measurement can include various entropy measurements such as Renyi entropy, differential entropy, and conditional mutual information, among others.

In another example, having reduced each sample to a k-mer set, another measure of information content can be utilized: the size of the k-met set or the cardinality of the sample. In some embodiments, the cardinality may be calculated after the removal of any stop words. The cardinality can be highly correlated with the entropy of the sample and can therefore be a good measure of the sample's diversity. Data samples with low cardinality are not very informative and can lead to errors when measuring similarity to other samples. Therefore, in some embodiments, k-mers manipulation module 110 can utilize a cardinality threshold. If a sample has a cardinality below such a threshold, then the sample may be discarded and not considered during analysis.

At block 206, vectorization module 112 generates a vector from the k-mers (and from the manipulated k-mers if block 204 is performed). In some embodiments, simply using the set of k-mers or manipulated k-mers itself as a vector can be inconvenient, since sizes may not be constant and they can also be very large. Therefore, vectorization module 112 may create a constant length vector; in some embodiments, this may be performed using a MinHash algorithm, shown below:

$$h_{min}(A) \equiv \min_{x \in A} h(x), \quad (1)$$

where h is a hash function that maps set elements to integers and A is a vector being processed.

In some embodiments, the disclosed system may not rely on a single, known hash function in order to make it known to an adversary (i.e., hacker or other bad actor) in advance. Therefore, in some embodiments, vectorization module 112 can access a series of random hash functions, selecting hash functions at random to be used in a given content (e.g., on every computer or every day). This can present a significant challenge for an adversary at a modest cost in terms of performance.

A benefit of converting the data in a concise, fixed-length vector is that it is useful for cyber-security related problems. Each vector is typically small in relation to the size of the actual data itself. In addition, the format and fixed length allows for easy storage of large quantities of vectors (e.g., in database 124), as well as easy handling and transportation between systems. This can have important impacts for systems that use such vectors and can allow for periodic updates of new vectors in a simple manner. They can also be highly portable and platform independent.

At block 208, classification module 116 determines the similarity of the sample to a second sample based on the vector generated by the vectorization module 112. In some embodiments, the similarity determination can be based on the Jaccard similarity between the vectors of the two samples. The Jaccard similarity expression is shown below in equation (2), $$J(A, B) = \frac{|A \cap B|}{|A \cup B|}, \quad (2)$$

which assigns a level of similarity in [0,1] to every pair of sets between the vector A representing a sample and the vector B representing another sample. Its complement distance metric is expressed as:

$$d_J = 1 - J. \quad (3)$$

The probability that h (i.e., the hash function) yields the same minimum value for two sets is equal to their Jaccard similarity; this is express below in equation (4):

$$Pr\ [h_{min}(A) = h_{min}(B)] = J(A,B). \quad (4)$$

In some embodiments, it may be easier to estimate the left-hand side of equation (4) than the right-hand side. This can be done by drawings Nh random hash functions. An estimator for the Jaccard similarity J is then given as:

$$\hat{J}(A, B) = \frac{1}{N_h} \sum_{i=1}^{N_h} \delta\left(h_{min}^{(i)}(A), h_{min}^{(i)}(B)\right), \quad (5)$$

where δ is the Kronecker delta. This estimator is unbiased; in other words, $E = \hat{J}$ and the expected error is $O(1/N_h)$. An estimator for the Jaccard distance is defined as $$\hat{d}_J = 1 - \hat{J} \quad (6)$$

which can also be referred to as the Hamming distance.

Since equation (5) uses the minimum value for each of the hash functions, the vector (i.e., the MinHash based vector) can be defined as $$\mathfrak{f}_A = [h_{min}^{(i)}(A), \ldots, h_{min}^{(N_h)}(A)], \quad (7)$$

a vector of length $N_h$. Once computed, the original set can be discarded and $\hat{J}$ can be computed directly and quickly using two vectors. In this manner, $\hat{d}_J$ defines a metric within the same vector space once the $N_h$ hash functions are drawn.

In some embodiments, variations can be made to the above procedure, such as those introducing weights. In addition, another variant of this procedure that uses $\text{argmin}_{x \in A} h(x)$ as the vector elements in equation (7) could also be used.

Alternatively or additionally, at block 210, classification module 116 classifies a sample by analyzing its distance to various clusters defined within the vector space. In some embodiments, the clusters may have been predetermined based on a population or subset of a population of partitioned samples.

To generate the clusters, clustering module 114 can accept various sample vectors (i.e., vectors created according to blocks 202-206 for a plurality of data samples) as an input and process them with various clustering algorithms. Such an algorithm would utilize the vectors as inputs, as well as the distance metric described in equation (6). The clustering algorithm assigns some of all of the input samples into distinct groups. These groups can then be reviewed for their common properties and significance and can be further filtered and/or modified as desired. Samples that were not assigned to a group are referred to as outliers and can either be discarded or further processed.

Grouping samples according to similarity can serve many useful purposes. It can be used, for example, to identify samples that have a common method of operation, have a common objective, have been created by the same developers, can be attributed to the same attack group, or are contemporaneous. In particular, this includes the identification of "malware families", a term commonly used to describe multiple samples of malware that share a common property, such as their method of operation, malicious capability or software ancestry. By applying clustering techniques, clustering module 114 can identify related groups of samples within a larger set of samples. This is a result of the natural tendency of related samples to be relatively similar. This is another example of the notion that the similarity measurements as described herein correlate well with business objectives.

If the generated clusters are coherent, a label can be assigned to it, characterizing the properties shared by samples belonging to the associated cluster. In some embodiments, this can be performed manually by expert analysis. Such grouping of samples into coherent similarity groups can then be used for compression, such as by creating detection parameters for identifying other members of these clusters.

Given a reference set of labeled sample vectors (e.g., malicious and benign samples), they can be used as the means to analyze new samples (e.g., the sample processed at blocks 202-206) and make determinations on their properties. Additional characteristics on the associated malware family or product identification can also be provided.

One way to perform such classification is to identify samples in the reference set that are similar to the sample (e.g., the vector generated at block 206). In other words, classification module 116 classifies a sample by analyzing its distance to various clusters defined within the vector space. A decision can be made, for example, by setting a threshold, such as a single global threshold or a threshold for every sample, and classifying a sample based on their distance to the labeled samples (i.e., the various clusters). For example, a sample can be convicted as malware based on its distance from other known malware samples. Alternatively, if the distance to known benign samples is below a certain threshold, it can be acquitted of maliciousness. This can be referred to as using an "allow list."

In some embodiments, additional properties (e.g., the specific malware family) can be assigned to the analyzed sample based on the properties of its several nearest neighbors and its distance from various malware-family clusters. The process of classification can be facilitated and improved upon by using the results of the clustering process in order to compress the reference index. This has the potential to enable classification in situations where resources are limited (e.g., on the endpoint). For example, a sample can be picked at random from each cluster and paired with a distance threshold (either constant or derived from the statistical properties of the cluster). An analyzed sample would then be declared as related to the cluster when its distance from the representative sample is below the threshold.

In some embodiments, and as alluded to above, block 210 can also include a nearest neighbor search. For example, given a reference set of sample vectors and some other sample to be analyzed (e.g., the sample from block 202), a certain number of the most similar samples from the reference set may be obtained. In such examples, classification module 116 can iterate the reference set, calculate distances between each member of the reference set and the sample vector, and obtain the samples that fit the desired objective. In some embodiments, this can include a Nearest Neighbor Search or certain variants, such as the Fixed-Radius Near Neighbors method, although others are also possible.

While the descriptions above have referred to the content of a sample as a sequence of bytes, the embodiments described herein are not so limited and are quite flexible. For example, the disclosed embodiments can handle samples whose content is a sequence of values of any magnitude.

Figure 3:
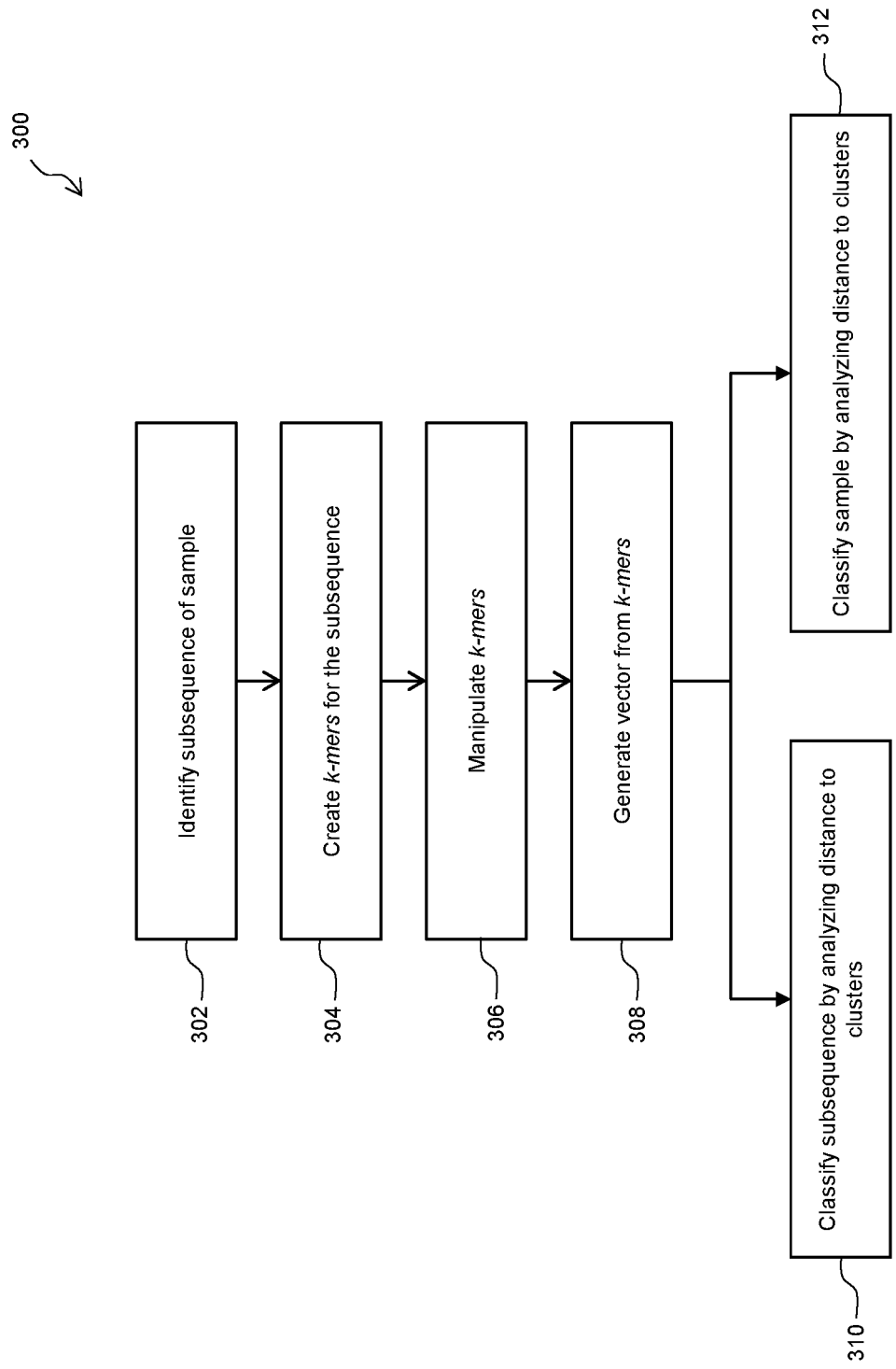
FIG. 3 is an example process for using subsequences to determine measurements of similarity between various types of data that can be performed within the system of FIG. 1, according to some embodiments of the present disclosure.

FIG. 3 is an example process 300 for using subsequences of samples to determine measurements of similarity between various types of data that can be performed within the system of FIG. 1, according to some embodiments of the present disclosure. In some embodiments, as described above, vectorizing an entire sample can yield effective similarity measurements. However, in other embodiments, it may often be desired to generate vectors for only specific parts of the sample. This can better correlate the similarity measurements described herein with the notion of business similarity and can be a useful approach for application such as identifying samples that share common parts (e.g., libraries, resources, etc.) generating vectors that have better accuracy, and identifying the location within a sample that is the source of the similarity. Relevant usage contexts can include: (1) searching for similarity within specific parts of a sample (e.g., creating an index of only the resources of a portable executable (PE) file); (2) finding smaller subsequences to be scanner for in larger data; (3) finding the similar parts within a given set of samples; and (4) finding similarities between samples in which most of the sample is expected to be inherently different than other samples (e.g., packed or encrypted) but other parts may be similar or common.

At block 302, subsequence extraction module 118 identifies a subsequence of a sample. Identification of a subsequence can occur in various ways. For example, in some embodiments, subsequence extraction module 118 can divide a data sample into slices of constant size. This allows the system to avoiding parsing the data in much the same way as the described method of vectorization does in relation to FIG. 2 and helps to achieve the desired effect of localized vectors for different areas of the sample.

In some embodiments, slicing the data sample into sections of constant size may inadvertently split important subsequences up, which could hinder the identification of such a subsequence. To address this, the disclosed principles allow for an optional overlap between consecutive sequences. Having such an overlap decreases the probability of a subsequence being split between slices dramatically. However, care must be taken not to choose too big of an overlap, as it will hinder performance and make consecutive slices more similar to each other. This method of subsequence extraction can, in some embodiments, be ideal for attempting to find subsequences within a given set of samples.

In some embodiments, rather than slicing the sample into segments of constant size, subsequence extraction module 118 can parse the sample into major components; this allows for the resulting vector to be generated piecemeal. Parsing such files into their major components (and subsequently generating a vector for each component) provides a finer resolution to the techniques discussed herein. For example, separate vectors could be generated for a sample based on the component type and then compared with other vectors from other samples of that type. This can often dramatically sharpen the similarities and dissimilarities within samples, as well as provide a more detailed visibility as to which part of the sample matches which part of another.

An example where such an approach can be useful is with PE files, which contain multiple parts (e.g., code section, data section, resources) and each of those parts has its own properties and importance. In such a case, a vector can be generated for each part. The same can be true for archive files (e.g., TAR) and some document files (e.g., Microsoft® Office®), which often have a complex internal structure containing multiple streams of text and images. These can be vectorized by part after parsing. In some other embodiments, it could be beneficial to only process specific parts of the object, such as the code sections of PE files, the textual content of document files, the image content of PDF files, etc.

In some embodiments, some data types (mainly executable files such as PE files) may be compressed, packed, or encrypted. This is usually done in a legitimate effort to reduce file size, protect intellectual property, or evade detection (e.g., malware files may wish to conceal their true content). Due to the nature of encryption and compression, these processes often result in samples which are very dissimilar from each other, even if the originals were fairly similar.

Encryption and compression, by their very nature, produce high entropy outputs that is uniformly distributed, making vectorization of the entire sample a sub-optimal strategy for similarity searches. However, it is usually quite difficult to encrypt an entire file. For example, for selfcontained executable files, there often is at least a small part which is responsible for decoding the file and executing the actual code (often called the loader). In addition, in many occasions, there exist parts of the file which are not encrypted or compressed such as icons and other resources. Therefore, it is useful to identify these parts of the sample and generate their vectors instead of doing so for the entire sample. This technique can make it possible to find similarities between samples, even when significant parts of them are encrypted or compressed.

To find these areas, subsequence extraction module 118 can search the sample for subsequences that appear to have relatively low randomness. Both this search and the measure for the randomness can be done in several ways. As discussed above, randomness measurements can be based on the Shannon entropy of the data sequence or the cardinality of its k-mer set. In either case, a randomness threshold can be defined and vectors are only generated for subsequences with randomness below the threshold.

Another method for identifying subsequence from a sample is by their similarity to a pre-defined set of "exclusion subsequences." For example, if a certain subsequence of a data sample matches an exclusion subsequence, it can be discarded from the similarity analysis. In such a methodology, areas of data can be removed from data samples that improve the business-similarity of the sample to other samples.

An exclusion set can be built automatically based on some criteria, such as prevalence of sequences in a set of reference samples. For example, a particular header structure (e.g., of PE files) or a resource common to many, unrelated samples. Identifying such a common subsequence and excluding it from vectorization steps can greatly improve the applicability of the disclosed similarity measurements.

In some embodiments, subsequence extraction module 118 can preprocess samples prior to the identification of subsequences; this can be especially useful for specific data types, such as ZIP files, UPX-packed executable files, etc. In these embodiments (e.g., compressed or packed samples), subsequence extraction module 118 extracts the relevant data first, since packing and compression are designed in such a way that any small change to the underlying data can result in a very significant change to the packed or compressed data. This can be detrimental to the premise of calculating similarity measurements. Extracting the underlying data can alleviate such an issue.

Another approach that can utilize pre-processing is applying some transformation or projection of the sample prior to the vectorization procedure in order to extract, emphasize or enhance some property of the data that would improve the relevance of the similarity measurements. An example is the conversion of a complex file format to a simpler one, such as a spreadsheet to a CSV (comma-separated values) file, or a PDF to a simple text file. Additionally, methods for data extraction are not limited to direct analysis of the sample content (see FIG. 5).

After one or more subsequences of a sample have been identified by subsequence extraction module 118, blocks 304-308 are performed in the same or a similar manner as described in blocks 202-206 of FIG. 2. In other words, the one or more subsequences are processed into sets of k-mers, optionally manipulated, and vectorized into one or more vectors.

At block 310, classification module 116 can classify a subsequence by analyzing its distance to various predefined clusters within the same vector space. This can be similar to block 208 of FIG. 2, except the predefined clusters can be based on vectors of subsequences of other samples, rather than vectors of entire samples. For example, given a set of samples with some relation to each other, it is often desirable to find the parts within the samples which are common. This can have many uses, from allowing analysts to concentrate on only new or important portions when analyzing a new sample, to automatic labeling of file parts according to function and extracting vectors for subsequences for scanning.

This can be achieved using a combination of techniques discussed above performed by clustering module 114: (1) extracting subsequences from each of the given reference samples using any of the methods described above; (2) calculate a MinHash vector for each subsequence of each sample and remember its location; and (3) cluster the vectors.

If the samples are indeed related, this process will in general provide a relatively small number of clusters. Each of the resulting clusters can then be inspected to identify those that contain vectors from a significant portion of the samples in the reference set. In the case where the set is part of a wider population of samples, this process can be further improved by removing parts which are common to other samples outside the set. By doing this, the other samples are effectively used as a baseline for parts that are common within the larger population. Furthermore, by taking a representative vector from each of these clusters (hereby referred to as motifs), a set of motifs can be extracted which "identifies", in a sense, the samples in the reference set.

A potential use for this procedure is in building a classifier algorithm, which predicts whether a sample should belong to the reference set. Once the motifs for the set have been determined, for each candidate sample, the properties of its similarity to the motifs can be calculated and used to perform the classification. One such method is to extract subsequences for it and calculate the minimal distance to each motif over all subsequences. These distances can then be used as features for any type of machine learning algorithms, performing the classification task.

Alternatively or additionally, at block 312, classification module 116 classifies a sample by analyzing distances to various predefined clusters within the vector space, which is based on the similarity of subsequences to the selected motifs. For this purpose, set of motifs extracted from a reference data set is established, as discussed above. Then, for each sample, a score for each of the motifs is assigned, reflecting the level of similarity between the two. An example for such a score is the maximal similarity of any subsequence in the sample to the motif in question. Other, more elaborate methods, such as aggregating similarity values (per motif), using TF-IDF, etc., can also be used. The similarity between samples can be based on a measure of similarity between their score vectors. This measure of similarity has the useful property of focusing on the subsequences that are significant in the data set. In addition, the approach described here allows for the adoption of various methods from the field of natural language processing for defining similarity between samples, as well as organizing and searching data sets.

Figure 4:
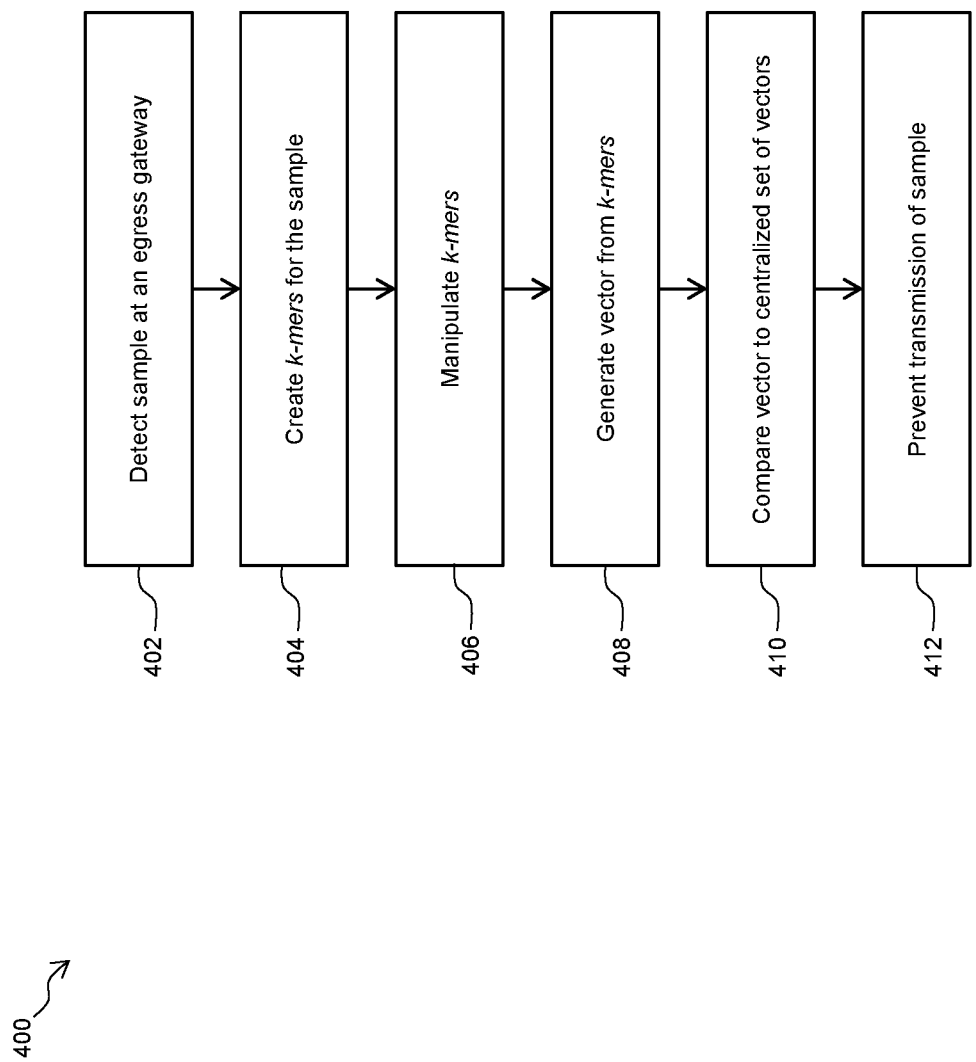
FIG. 4 is an example process for preventing data leaks that can be performed within the system of FIG. 1, according to some embodiments of the present disclosure.

FIG. 4 is an example process 400 for preventing data leaks that can be performed within the system of FIG. 1, according to some embodiments of the present disclosure. Process 400 can be performed to prevent confidential information from leaving an organizational (or other) perimeter or environment. Process 400 can utilize a centralized set of vectors for data samples that should be considered confidential. Process 300 also utilizes the deployment of content scanning components (e.g., data egress gateways) in the environment that are configured to prevent anything similar to one of the samples in the centralized set from leaving the perimeter. At block 402, one or more egress gateways scanners 120 detect a sample in the process of leaving the protected environment.

At block 404, k-mers generation module 108 creates a plurality of k-mers for the sample, such as described in block 202 of FIG. 2. At block 406, k-mers manipulation module 110 manipulates the plurality of k-mers created at block 404, such as described in block 204. At block 408, vectorization module 112 creates a vector for the sample from the plurality of k-mers, such as described in block 206. At block 410, classification module 116 compares the vector to the centralized set of vectors. This comparison can include approximating the Jaccard similarity between the vector and each of the members of the centralized set, such as via the techniques described at block 208 of FIG. 2. If the similarity measurement is above a certain predefined threshold, then, at block 412, the associated egress gateway scanner 120 prevents transmission of the sample outside of the protected environment.

In various applications of the processes described in FIGS. 2-4, performance and speed may be important considerations, such as during real-time scans on endpoints. In such applications, the vectorization and index lookup should be as efficient as possible. One of the challenges of improving run-time efficiency is the implementation of MinHash. While the algorithm itself does not specify specific hash functions to be used (as long as they adhere to the basic requirements), the techniques herein can take advantage of the fact that the disclosed k-mers are unsigned 32-bit integers to greatly improve performance and simplify the implementation. Since both the inputs and outputs of the hash functions are 32-bit integers, such implementation is in fact equivalent to choosing random permutations of the k-mer space.

With respect to index lookups, an efficient and simple nearest-neighbors index can be constructed, allowing the query of neighbors to be faster than the $O(N_h \log|F|)$, with complexity of nearly $O(N_h)$. The disclosed vectors are organized in $N_h$ hash maps (or dictionaries), each mapping vector values to sets of vector identifiers. More formally, for every $i \in \{1, \ldots, N_h\}$, let $H_i$ be the image of the MinHash hash function $h^{(i)}$. Then, the functions $\Gamma_i: H_i \to 2^F$ are defined as:

$$\Gamma_i(v) = \{f \in F | f_i = v\}. \quad (8)$$

To find the nearest neighbors for a given query vector q, $N_h$ lookup operations are performed and $\Gamma_i(q_i)$ is found for each query value $q_i$. The similarity of each $f \in F$ to q is then given by:

$$\hat{J}(f, q) = \frac{1}{N_h} \sum_{i=1}^{N_h} \mathbb{1}_{\Gamma_i(q_i)}(f), \quad (9)$$

where $I_A$ is the indicator function for the set A. In some embodiments, equation (9) can be calculated only on vectors in $\cup_i \Gamma_i(q_i)$, which is an efficient calculation to perform.

In some embodiments, this implementation can become less efficient for larger |F| because the number of keys for the dictionaries can grow very large and, as the value gets large, evaluating equation (9) becomes slower. For computation on endpoints, it allows for very low query times and is simple to implement.

In addition to calculating the MinHash vector for an entire file or data sample, it is sometimes useful to search for smaller patterns inside larger data. This is especially useful when scanning for vectors of sub-sequences as described in FIG. 4, such as a single resource inside an entire PE file or a single module in a full memory dump. In order to do this, a given data sample can be scanned using a sliding window, calculating the vector only on the data within the window at each offset. Each of these vectors can then be compared to an index of reference vectors (e.g., by means of a nearest-neighbors query). The matching results can be sorted (e.g., by match distance) and subsequently only a subset reported (e.g., the best, several best or results beyond a certain threshold).

While useful, recalculating the vector for each offset naively can be inefficient. Instead, the disclosed principles can take advantage of the mechanics of MinHash to greatly improve the scanning time. Since MinHash operates on a set of k-mers, as the window slides, only a pair of k-mers—one entering and one exiting the window—can be considered at a time.

At the initial window position, in addition to calculating the vector as usual (see block 206), the system also keeps track of which k-mer was selected as the minimum for each of the $N_h$ hash functions $h_{(i)}$. In other words, the system keeps a vector m of length $N_h$, where $m_i = \text{argmin}_{x \in K} h^{(i)}(x)$ and K is the k-mer set of the data in the window. At each new window offset, as the window moves one byte over the data, there is a single new k-mer, $x_{in}$, introduced relative to the previous window offset and a single one, $x_{out}$ leaving the window. If $x_{in} = x_{out}$ there is no need to recalculate the vector. Otherwise, we calculate $h(i)(x_{in})$ and compare it to the vector value for index i. If the former is smaller, it is the new vector value, and xinis placed in $m_i$. Otherwise, if $m_i 6 = x_{out}$, there is no need to update the vector at index i. Only if mi=$x_{out}$, the vector component at index i must be recalculated (including xinin the k-mer set instead of $x_{out}$) and $m_i$ updated accordingly. This procedure effectively saves the need to calculate the value of the hash functions in most of the window positions and vector indices, thus speeding up the calculations considerably.

It is worth noting that this method can be flexible enough to process sliding windows of multiple sizes in a single pass. This facilitates the usage of vectors generated over subsequences of arbitrary sizes. Furthermore, this method is a special case of the broader concept of a rolling hash. Whichever hashing scheme is used in order to calculate the vectors, it is highly beneficial to adapt it to be calculated in a rolling fashion, on a sliding window, allowing for efficient searching of vectors.

The techniques for similarity measurements described herein possess intrinsic properties that make it difficult for an adversary to subvert its usefulness. Generally speaking, an adversary will typically have one or more of the following objectives: making a sample appear similar to other samples (e.g., to hide malware among legitimate software), making a sample appear dissimilar to other samples (e.g., to disassociate related malware), and making a sample appear dissimilar to any other sample previously seen (e.g., to avoid automated processing procedures).

Given a sample that produces some vector, and since the vector of a sample is directly derived from its content, it is likely that an adversary will attempt to create derivative samples with different content, in an attempt to find a different sample with a modified vector which satisfies their objective, while preserving the functionality of the original sample.

The first sample modification method for an adversary is to add additional content. The specifics of how this is done depend on the format of the sample and its functionality. The similarity $J(f, f_0)$ will decrease as more data is added. However, it will decrease slowly (roughly by a factor of $|f_0|/|f|$). This forces the adversary to dramatically increase the sample size, typically to more than double the original size, which exposes the sample to risk of being detected as containing garbage data. Moreover, the content used to increase the sample size must be carefully selected, as it is further limited by the principles described herein. To decrease the similarity, it must be significantly different from the original content of the sample, and it must not be repetitive, for the same reason. It must also not be random generated, as this will both expose the sample to detection by other cybersecurity methods and will be susceptible to data extraction techniques that filter out areas of high randomness.

Furthermore, content must be added in all areas of the sample. Otherwise, as long as significant subsequences of the original content remain relatively unchanged, they are susceptible to data extraction techniques that process subsequences of the data. This is always difficult to do while preserving functionality and is especially difficult when the samples are executable programs. Finally, even if an adversary develops some advanced method that satisfies all of the above constraints, such a method must be reapplied to each new sample, while also creating new samples that are dissimilar from each other. Otherwise, the new samples risk being eventually identified as a cluster of their own. All of these factors contribute to a situation where, while not impossible for an adversary to subvert our method by adding data, it is very risky, extremely expensive, and often temporary.

The second sample modification method is modifying content in-place. For most types of content, this is very hard to do while preserving functionality. While for some types of samples there may be some redundancy built into the format encoding, this can be easy to mitigate. This gets further complicated by the disclosed usage of very short k-mer values, requiring that modifications take place in the resolution of 1-2 bytes to have any impact. Finally, as with the previous method, these changes must take place throughout the content of the sample, for the exact same reason. All of these factors create once more a situation where it is increasingly impractical for an adversary to subvert the disclosed embodiments.

The third sample modification method is deleting content. However, for all of the reasons described above that apply for this case as well, the adversary will be forced to remove major portions of the sample content just to reduce its similarity to other samples by a few percent. This is often difficult to do while maintaining a valid sample especially when the sample is constrained (e.g., to be letters or words) and much more so when attempting to preserve its original functionality. As long as the adversary is not willing to sacrifice functionality, it is impractical to avoid being detected.

A fourth sample modification method is keeping the original content but changing the order of sub-sequences within it. While this might subvert some methods of subsequence data extraction, it has no impact on the basic usage of the disclosed vectorization techniques on the entire sample content, and so is not a useful method for subversion.

The above methods can of course be combined to work together. However, there is no compound benefit from using multiple approaches at once. Since each of them is extremely impractical, combining them is not a useful method for subversion.

Another method, referred to as adversarial machine learning, involves generating a stream of samples and using our method as a feedback tool for identifying candidates that escape detection. Similarly, it can be used for tuning and accelerating the candidate generation process. This approach, which is all too often a silver bullet against cyber-security technologies, can be easily thwarted by the introduction of elements that cannot be known to the adversary before they make their attack. For example, in the detection process, the disclosed principles could take into account information about samples local to the network under attack. Another more elaborate scheme is to use a random subset of hash functions for generating vectors in every local context (e.g., on every protected endpoint). These methods take away the feedback tool from the adversary, rendering this approach ineffective.

Other techniques for subversion can of course be applied, some generally applicable and some specific to certain applications. However, the core properties of the disclosed methods make it especially resilient in the face of adversarial attacks, providing the tools to identify targeted attack methods and thwart them by making reasonable modifications.

In addition, there are various additional applications of the vectorization techniques and similarity measurements described herein. First, various additional characteristics can be deduced for detected malware samples, such as an attribution to specific attack groups, development groups, or malicious campaigns; indications of the kind of malicious intent that is likely to be behind the attack (e.g., espionage, inflicting damage, etc.); and the genealogy of the sample, including previously released samples of related nature and information about the software origins.

Another application is the exclusion of legitimate content, such as a system that detects and characterizes pieces of information deemed to be legitimate (either non-malware or for any other reason). This prediction can then be used in a variety of ways and possibly in combination with other systems, such as, but not limited to, the conviction of any software not otherwise allowed (i.e., "block unless allowed", sometimes referred to as application whitelisting); and the incorporation of such information as a supporting factor in other systems, either directly analyzing the same content, or making a larger decision impacted by the analysis results.

Another possible application is the creation of a reference similarity database (e.g., a nearest-neighbors index) of content found in some predefined context, such as an organization or a sub-division. It can then serve as the basis for search-based applications in a variety of contexts, not necessarily security oriented. For example, such an application can allow to determine the prevalence of software products and their different versions in an organization; to identify a trail for some piece of content that travels through the organization; or to search for the existence of confidential documents in places where they should not be present.

Additionally, such a database can be employed to identify and analyze groups of related samples, such as versions of some software application or revisions of some document. This information can be used for direct analysis, as well as to augment Data Leak Prevention methods, such as the one discussed in relation to FIG. 4.

Another important property of having such a content index is the ability to construct chains of similarity. We can consider two samples, A and C, whose similarity is not directly obvious; however, given an additional sample B found in our content index, we could identify the connection between A and C, by identifying the similarities between A and B, and B and C. In this way, sample B serves as an "evolutionary missing link" between A and C, allowing us to bridge a similarity gap between them.

Another application is a threat intelligence feed. Using the core methods described herein, it is possible to create a system which scans content and labels it, as well as characterizes it with useful information. Such a system can be used to process arbitrary sources of content and generate from them a useful feed for Threat Intelligence purposes.

For example, public file source streams can be sieved for the existence of significant (or otherwise interesting) threats, producing a curated feed of indicators (e.g., SHA-256 hashes) tagged with useful information. In a similar fashion, organizational content can be continuously streamed and analyzed, generating a similar feed of indicators and tags which can then be used in other contexts within the organization. Samples of interest could be found by, for example, similarity to other samples which were previously analyzed, characterized and tagged, or by clustering samples and analyzing their properties.

Several types of threat intelligence information can be provided using sample similarity and identification of its "genealogy" and similarity to a reference set of samples. Examples include, but are not limited to, the attribution to a specific attack group, malicious campaign, or developers; identification of other specific samples which are similar to the sample in question; and identification of various capabilities and functionalities of a sample, such as the ability to encrypt, communicate, etc., based on similarities to known software libraries and other pieces of code.

In another application of the disclosed principles, it is possible to create applications that assists security analysts in their tasks. These include, but are not limited to, a repository of reference samples to search for similar matches of some given sample for the purpose of assisting in the task of analyzing the given sample and its properties; a detection mechanism to provide the analyst with an assessment of the risk level of a given sample; a mechanism for analyzing arbitrary artifacts (e.g. memory dumps) and identifying those that merit further analysis, as well as specific regions of interest within them; or a tool for analyzing the internal composition a given sample, identifying sub-sections of either original content or content previously known, assisting in the task of artifact analysis and in particular reverse-engineering of programs.

In another application, it is possible to establish a protocol for definition of Indicators of Compromise (IOCs) and communicating them between entities. A typical use of IOCs is after an initial sample is identified as malicious. An indicator is then derived from it and published so that it can later be used to identify related samples. Popular realizations of IOCs are cryptographic hashes and YARA signatures. IOCs based on MinHash vectors would have significant advantages over those methods, such as, compared to indicators based on cryptographic hash functions (commonly SHA-1, MD5 and SHA-256), which can only identify exact copies of the original sample, the disclosed vector indicators are flexible enough to identify never-before-seen threats that are similar to the original sample. In addition, compared to YARA signatures, which need to be carefully and manually generated, the disclosed vector indicators can be automatically generated based on algorithmic analysis. In order to create a vector IOC from a given sample, the above methods can be used to create a vector for that sample and establish a threshold of similarity for another sample to be considered a match for this IOC.

In another application, it is possible to derive useful insights for use in Endpoint Detection and Response (EDR) systems. This can include identification of related content entities so that their analysis can be done in a shared context; usage of characterization predicted for some content as a means to prioritize alerts and other analyst actions; usage of said characterization as a basis for defining automated response actions; usage of said characterization as a basis for evaluating the risk level and the potential involved threat actors; and much more. The same principle can similarly be applied in related systems, such as Extended Detection and Response (XDR) systems.

In another application, it is possible to construct a system for scanning existing content on an organizational IT environment and use the detection and characterization results for that content as a basis for evaluating the security posture of the environment (i.e., security posture analysis). This could include, but is not limited to, identifying software usage that is not according to company policy; identifying software being used with inconsistent or obsolete versions; identifying sensitive material being stored where it should not; identifying dormant malicious assets (such as back-door or web-shell malicious assets); and/or identifying unknown o rare pieces of software and marking them for further analysis.

In another application, it is possible to construct a system for detecting malicious samples that contain within them significant portions of the content of other legitimate samples (i.e., the detection of feigned legitimacy). This scenario takes place in many attack techniques, such as adding back-doors to legitimate software, bundling parts of legitimate software to impersonate as that software (for the purpose of fooling either a person or a detection mechanism); or modifying existing software with a computer virus.

First, samples can be identified that are similar to legitimate software. This can be done by, for example, measuring similarity to a reference set of such software or searching for subsequence similarity to samples of this reference set. Then, indications can be discovered that the sample is not legitimate, such as not being digitally signed, not appearing in public software databases, having never before been seen, and so on. Legitimate software may not have any such indications that do not appear on the reference samples, and so, when such indications are found, those samples can be detected as malicious.

Figure 5:
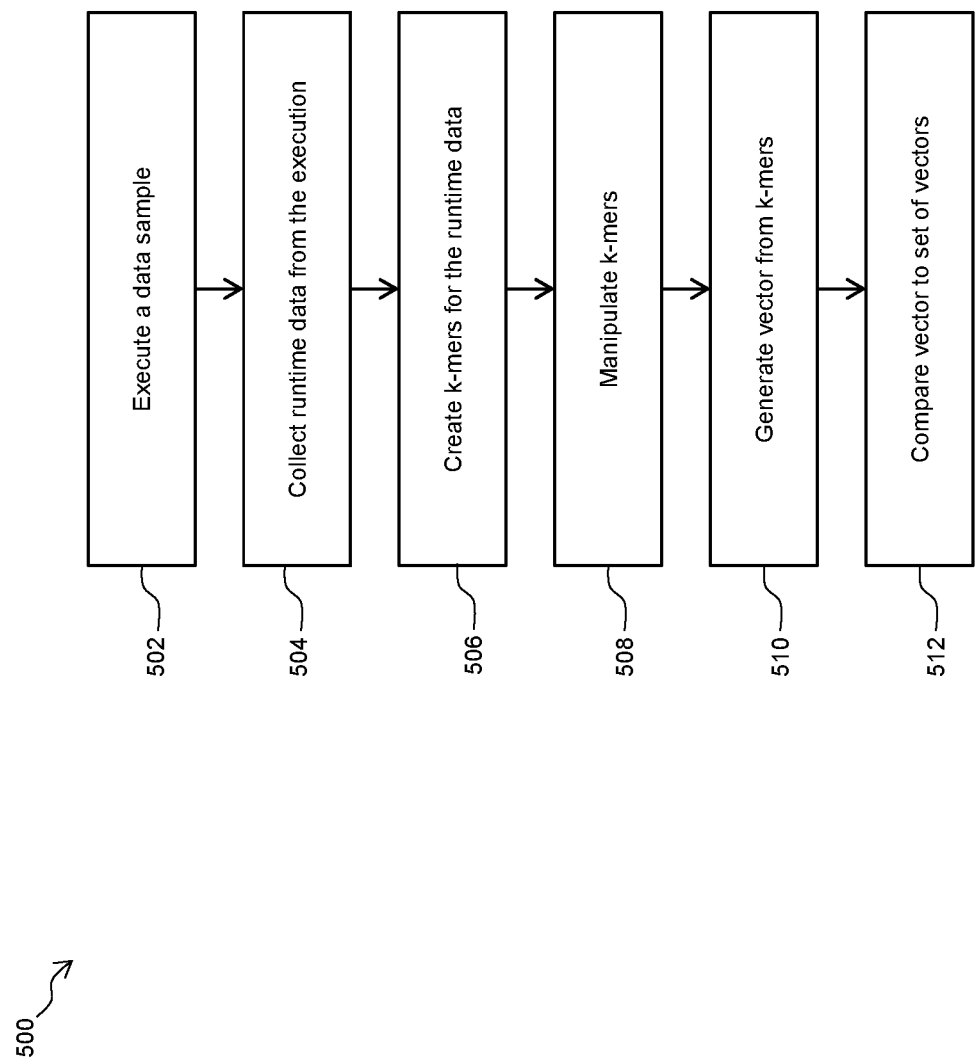
FIG. 5 is an example process for determining measurements of similarity between executable files that can be performed within the system of FIG. 1, according to some embodiments of the present disclosure.

FIG. 5 is an example process 500 for determining measurements of similarity between executable files that can be performed within the system of FIG. 1, according to some embodiments of the present disclosure. Process 500 can be performed as a scheme for comparing executable programs based on their runtime properties. At block 502, subsequence extraction module 118 executes a data sample. In some embodiments, the execution can be performed in a controlled environment, such as a sandbox. At block 504, subsequence extraction module 118 collects runtime data associated with the execution of the data sample. In some embodiments, runtime data can include information such as memory buffer information, intermediate files, API tracing information, etc.

From here, the runtime data can be vectorized instead of (or in addition to) the original content of the sample. Blocks 506-512 can be performed in the same or a similar manner as described in blocks 202-206 of FIG. 2. In other words, the runtime data from an execution of a data sample is processed into sets of k-mers, optionally manipulated, and vectorized into one or more vectors. Such vectors can then be compared to other individual vectors or a set/cluster of reference vectors to make determinations on the maliciousness level of the original sample.

Figure 6:
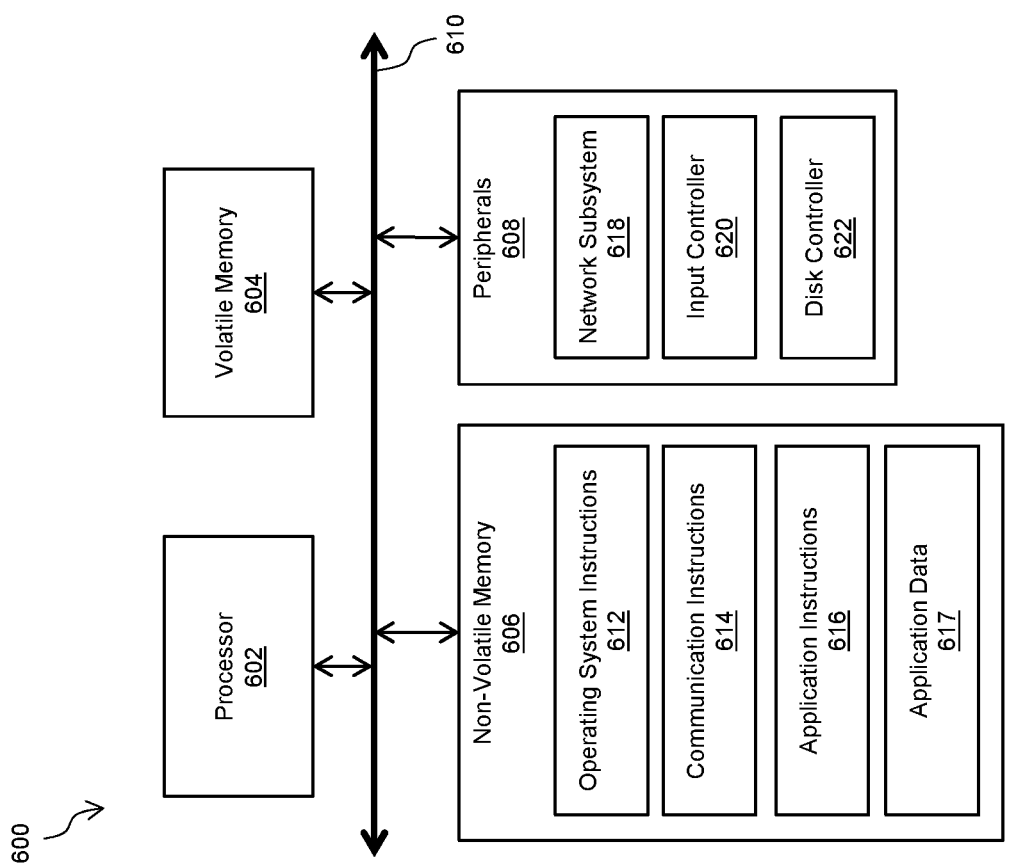
FIG. 6 is an example server device that can be used within the system of FIG. 1 according to an embodiment of the present disclosure.

FIG. 6 is a diagram of an example server device 600 that can be used within system 100 of FIG. 1. Server device 600 can implement various features and processes as described herein. Server device 600 can be implemented on any electronic device that runs software applications derived from complied instructions, including without limitation personal computers, servers, smart phones, media players, electronic tablets, game consoles, email devices, etc. In some implementations, server device 600 can include one or more processors 602, volatile memory 604, non-volatile memory 606, and one or more peripherals 608. These components can be interconnected by one or more computer buses 610.

Processor(s) 602 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 610 can be any known internal or external bus technology, including but not limited to ISA, EISA, PCI, PCI Express, USB, Serial ATA, or FireWire. Volatile memory 604 can include, for example, SDRAM. Processor 602 can receive instructions and data from a read-only memory or a random access memory or both. Essential elements of a computer can include a processor for executing instructions and one or more memories for storing instructions and data.

Non-volatile memory 606 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 can store various computer instructions including operating system instructions 612, communication instructions 614, application instructions 616, and application data 617. Operating system instructions 612 can include instructions for implementing an operating system (e.g., Mac OS®, Windows®, or Linux). The operating system can be multi-user, multiprocessing, multitasking, multithreading, real-time, and the like. Communication instructions 614 can include network communications instructions, for example, software for implementing communication protocols, such as TCP/IP, HTTP, Ethernet, telephony, etc. Application instructions 616 can include instructions for various applications. Application data 617 can include data corresponding to the applications.

Peripherals 608 can be included within server device 600 or operatively coupled to communicate with server device 600. Peripherals 608 can include, for example, network subsystem 618, input controller 620, and disk controller 622. Network subsystem 618 can include, for example, an Ethernet of WiFi adapter. Input controller 620 can be any known input device technology, including but not limited to a keyboard (including a virtual keyboard), mouse, track ball, and touch-sensitive pad or display. Disk controller 622 can include one or more mass storage devices for storing data files; such devices include magnetic disks, such as internal hard disks and removable disks; magneto-optical disks; and optical disks.

Figure 7:
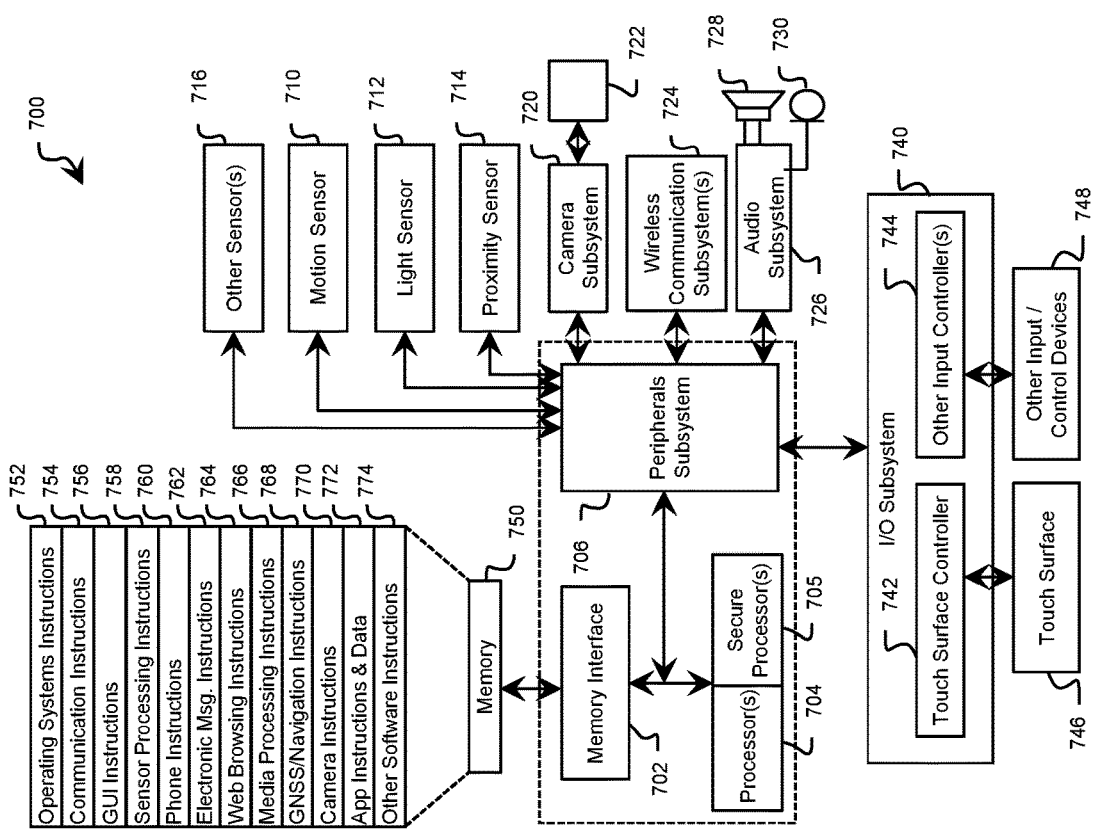
FIG. 7 is an example computing device that can be used within the system of FIG. 1 according to an embodiment of the present disclosure.

FIG. 7 is an example computing device that can be used within the system 100 of FIG. 1, according to an embodiment of the present disclosure. In some embodiments, device 700 can be endpoint 102. The illustrative user device 700 can include a memory interface 702, one or more data processors, image processors, central processing units 704, and/or secure processing units 705, and peripherals subsystem 706. Memory interface 702, one or more central processing units 704 and/or secure processing units 705, and/or peripherals subsystem 706 can be separate components or can be integrated in one or more integrated circuits. The various components in user device 700 can be coupled by one or more communication buses or signal lines.

Sensors, devices, and subsystems can be coupled to peripherals subsystem 706 to facilitate multiple functionalities. For example, motion sensor 710, light sensor 712, and proximity sensor 714 can be coupled to peripherals subsystem 706 to facilitate orientation, lighting, and proximity functions. Other sensors 716 can also be connected to peripherals subsystem 706, such as a global navigation satellite system (GNSS) (e.g., GPS receiver), a temperature sensor, a biometric sensor, magnetometer, or other sensing device, to facilitate related functionalities.

Camera subsystem 720 and optical sensor 722, e.g., a charged coupled device (CCD) or a complementary metal-oxide semiconductor (CMOS) optical sensor, can be utilized to facilitate camera functions, such as recording photographs and video clips. Camera subsystem 720 and optical sensor 722 can be used to collect images of a user to be used during authentication of a user, e.g., by performing facial recognition analysis.

Communication functions can be facilitated through one or more wired and/or wireless communication subsystems 724, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 724. The specific design and implementation of communication subsystems 724 can depend on the communication network(s) over which the user device 700 is intended to operate. For example, user device 700 can include communication subsystems 724 designed to operate over a GSM network, a GPRS network, an EDGE network, a WiFi or WiMax network, and a Bluetooth™ network. For example, wireless communication subsystems 724 can include hosting protocols such that device 700 can be configured as a base station for other wireless devices and/or to provide a WiFi service.

Audio subsystem 726 can be coupled to speaker 728 and microphone 730 to facilitate voice-enabled functions, such as speaker recognition, voice replication, digital recording, and telephony functions. Audio subsystem 726 can be configured to facilitate processing voice commands, voice-printing, and voice authentication, for example.

I/O subsystem 740 can include a touch-surface controller 742 and/or other input controller(s) 744. Touch-surface controller 742 can be coupled to a touch-surface 746. Touch-surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In some implementations, a pressing of the button for a first duration can disengage a lock of touch-surface 746; and a pressing of the button for a second duration that is longer than the first duration can turn power to user device 700 on or off. Pressing the button for a third duration can activate a voice control, or voice command, module that enables the user to speak commands into microphone 730 to cause the device to execute the spoken command. The user can customize a functionality of one or more of the buttons. Touch-surface 746 can, for example, also be used to implement virtual or soft buttons and/or a keyboard.

In some implementations, user device 700 can present recorded audio and/or video files, such as MP3, AAC, and MPEG files. In some implementations, user device 700 can include the functionality of an MP3 player, such as an iPod™. User device 700 can, therefore, include a 36-pin connector and/or 8-pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store an operating system 752, such as Darwin, RTXC, LINUX, UNIX, OS X, Windows, or an embedded operating system such as VxWorks.

Operating system 752 can include instructions for handling basic system services and for performing hardware dependent tasks. In some implementations, operating system 752 can be a kernel (e.g., UNIX kernel). In some implementations, operating system 752 can include instructions for performing voice authentication.

Memory 750 can also store communication instructions 754 to facilitate communicating with one or more additional devices, one or more computers and/or one or more servers. Memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic messaging-related process and functions; web browsing instructions 764 to facilitate web browsing-related processes and functions; media processing instructions 766 to facilitate media processing-related functions and processes; GNSS/Navigation instructions 768 to facilitate GNSS and navigation-related processes and instructions; and/or camera instructions 770 to facilitate camera-related processes and functions.

Memory 750 can store application (or "app") instructions and data 772, such as instructions for the apps described above in the context of FIGS. 2-4 and for modules 108-118. Memory 750 can also store other software instructions 774 for various other software applications in place on device 700.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for classifying a data sample comprising:
    identifying a subsequence of the data sample, the data sample comprising a plurality of subsequences, wherein each subsequence forms a subset of the data sample;
    measuring a level of randomness in the identified subsequence, the measuring comprising calculating an entropy or a cardinality of the identified subsequence, wherein the entropy or the cardinality represent the level of randomness in the identified subsequence;
    in response to determining that the level of randomness is below a pre-defined threshold, creating a plurality of k-mers from the identified subsequence of the data sample, each k-mer having a first length;
    generating a vector from the plurality of k-mers by processing the plurality of k-mers with a plurality of hash functions, the vector representing the identified subsequence;
    comparing the vector to at least one other vector to determine at least one distance metric, the at least one other vector representing at least one subsequence of other samples; and
    based on the at least one distance metric, determining a characteristic of the data sample.

2. The computer-implemented method of claim 1, wherein the other samples are associated with malware or a program that causes damage.

3. The computer-implemented method of claim 1, wherein the other samples are known to be benign.

4. The computer-implemented method of claim 1, wherein the at least one other vector comprises a cluster of other vectors, wherein comparing the vector to the cluster of other vectors comprises iterating through the cluster of other vectors based on distance metrics with a Nearest Neighbors search or a Fixed-Radius Near Neighbors method.

5. The computer-implemented method of claim 4, wherein the Nearest Neighbors search comprises performing a number of reverse lookup operations for the vector equal to a number of hash functions in the plurality of hash functions.

6. The computer-implemented method of claim 1 comprising, prior to creating the plurality of k-mers, determining that the subsequence of the data sample does not match any of a predetermined set of excluded subsequences.

7. The computer-implemented method of claim 1, wherein determining the at least one distance metric comprises approximating a similarity or calculating a distance between the vector and the at least one other vector.

8. The computer-implemented method of claim 7, wherein approximating the similarity comprises using a MinHash function on each of the plurality of hash functions.

9. The computer-implemented method of claim 1, where the first length is at least three bytes.

10. The computer-implemented method of claim 1 comprising determining the first length based on at least one statistical property of the data sample.

11. The computer-implemented method of claim 1 comprising, prior to generating the vector, at least one of manipulating, modifying, or selecting the plurality of k-mers.

12. The computer-implemented method of claim 11, where manipulating the plurality of k-mers comprises at least one of removing at least one k-mer or mapping two or more k-mers to a representative value.

13. The computer-implemented method of claim 1, wherein the plurality of k-mers is generated such that at least one of the k-mers partially overlaps another.

14. The computer-implemented method of claim 1, wherein identifying the subsequence of the data sample comprises dividing the data sample into parts of constant size.

15. The computer-implemented method of claim 14, wherein two or more of the parts overlap.

16. The computer-implemented method of claim 1, wherein:
    identifying the subsequence of the data sample comprises:
        parsing the data sample to identify a plurality of components; and
        selecting at least one of the plurality of components as the subsequence;
    wherein the at least one subsequence of other samples has a component type related to the selected components of the data sample.

17. The computer-implemented method of claim 1, wherein identifying the subsequence of the data sample comprises dividing the data sample into sections of a predetermined size or a distribution.

18. The computer-implemented method of claim 1, wherein identifying the subsequence of the data sample comprises parsing the data sample into a plurality of components.

19. The computer-implemented method of claim 1, wherein identifying the subsequence of the data sample comprises identifying a portion of the data sample that is unencrypted or uncompressed.

20. The computer-implemented method of claim 19, wherein identifying the portion of the data sample that is unencrypted or uncompressed comprises:

calculating a randomness for the portion; and
determining that the randomness of the portion is below a predefined randomness threshold.

21. The computer-implemented method of claim 1, wherein identifying the subsequence of the data sample comprises determining that the subsequence does not match an exclusion sequence.

22. A system for protecting a plurality of endpoints comprising: a server communicably coupled to a plurality of endpoints, the server being configured to:
   access an endpoint of the plurality of endpoints;
   identify a data sample residing on the accessed endpoint of the plurality of endpoints;
   measure a level of randomness in the identified data sample, the measuring comprising calculating an entropy or a cardinality of the data sample, wherein the entropy or the cardinality represent the level of randomness in the identified subsequence;
   in response to determining that the level of randomness is above a pre-defined threshold, create a plurality of k-mers from the data sample, each k-mer having a first length;
   generate a vector from the plurality of k-mers by processing the plurality of k-mers with a plurality of hash functions, wherein the plurality of hash functions is chosen at random for each endpoint;
   determine a distance metric between the data sample and a reference data sample by comparing the vector to a reference vector, the reference vector representing the reference data sample; and
   based on the distance metric, determine a maliciousness level of the data sample.

23. The system of claim 22, wherein the server is configured to use deployment information associated with the plurality of endpoints to determine the distance metric.

24. The system of claim 22, wherein determining the distance metric comprises approximating a similarity between the vector and the reference vector.

25. The system of claim 24, wherein approximating the similarity comprises using a MinHash function on each of the plurality of hash functions.

26. The system of claim 22, where the first length is at least three bytes.

27. The system of claim 22, wherein the server is configured to determine the first length based on at least one statistical property of the data sample.

28. The system of claim 22 wherein the server is configured to, prior to generating the vector, at least one of manipulate, modify, or select the plurality of k-mers.

29. The system of claim 28, wherein manipulating the plurality of k-mers comprises at least one of removing at least one k-mer or mapping two or more k-mers to a representative value.

30. The system of claim 22, wherein the plurality of k-mers is generated such that at least one of the plurality of k-mers partially overlaps another.

31. The system of claim 22, wherein measuring the level of information content comprises performing an information theoretic measurement of the data sample.

* * * * *